United States Patent [19]
Elliott et al.

[11] 3,922,269
[45] Nov. 25, 1975

[54] OXIMES OF 3-FORMYLCYCLOPROPANE CARBOXYLIC ACID ESTERS
[75] Inventors: Michael Elliott, Harpenden; Norman Frank Janes, Luton; David Allen Pulman, Harpenden, all of England
[73] Assignee: National Research Development Corporation, London, England
[22] Filed: Dec. 20, 1973
[21] Appl. No.: 427,622

[30] Foreign Application Priority Data
Dec. 21, 1972 United Kingdom............... 59185/72
Aug. 31, 1973 United Kingdom............... 41048/73

[52] U.S. Cl. ......... 260/347.4; 260/430; 260/468 H; 260/501.1; 260/514 H; 260/326 N; 260/465 D; 424/285; 424/274; 424/306; 424/316; 424/317
[51] Int. Cl.² ..................................... C07D 307/46
[58] Field of Search................................. 260/347.4

[56] References Cited
FOREIGN PATENTS OR APPLICATIONS
1,168,797 10/1969 United Kingdom
1,283,225 7/1972 United Kingdom OTHER PUBLICATIONS
Shirley, "Organic Chemistry," 1964, pp. 317–319.

Primary Examiner—Harry I. Moatz
Attorney, Agent, or Firm—Cushman, Darby & Cushman

[57] ABSTRACT
New insecticides are of the formula:

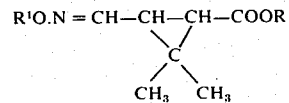

where $R^1$ is H, alkyl or alkenyl and R is a group that forms insecticidal esters with chrysanthemic and related acids. R may be e.g. 5-benzyl-3-furylmethyl or α-cyano-3-phenoxybenzyl and the compounds are prepared by esterification procedures. The corresponding acids, salts, halides and alkyl esters are also new and are prepared by oximation of the corresponding caronaldehyde.

9 Claims, No Drawings

OXIMES OF 3-FORMYLCYCLOPROPANE CARBOXYLIC ACID ESTERS

This invention relates to insecticides and more particularly to synthetic insecticides of the pyrethrin type, to their preparation, to compositions containing them and to the insecticidal use of the compounds and compositions.

For many years, research has been pursued in the field of synthetic analogues of the pyrethrins to discover synthetic substitutes havng properties superior to those of the natural products. Ideally, synthetic analogues of the naturally occurring pyrethrins should compare well with or be superior to the natural products as regards level of toxicity to insects and mammals, insecticidal spectrum and knock down properties and, in addition, should offer ease of manufacture.

Since the discovery that the naturally occurring pyrethrins were esters of certain substituted cyclopropane carboxylic acids and substituted cyclopentenolones, the search for synthetic analogues concentrated initially on modifying the "alcohol" part of the ester molecule and later on modifying the "acid" part of the ester molecule or, in some cases, modifying both parts of the ester molecule. The naturally occurring esters are esters of chrysanthemic or pyrethric acids of the formula:

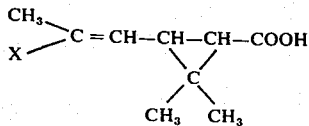   I where X represents a methyl group (chrysanthemic acid) or a carbomethoxy group (pyrethric acid). We have now found that a particularly valuable combination of toxicity and knock down properties can be obtained in esters of 2,2-dimethyl-3-substituted cyclopropane carboxylic acids where there is an oxime substituent in the 3 position. Although insecticidal esters of cyclopropane carboxylic acid have been reported having nitrogen in the substituent at the 3 position of the cyclopropane ring, this is believed to be the first occasion in which an oxime substituent has been present in the 3 substituent and the first carbon atom of the 3 substituent is linked to an element other than carbon or hydrogen.

Accordingly, the present invention provides acids and esters of the general formula:

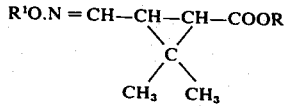   II wherein $R^1$ represents a hydrogen atom or an alkyl or alkenyl group and R represents hydrogen (and salts and acid halides of that acid) or an alkyl group or a group of the formula:

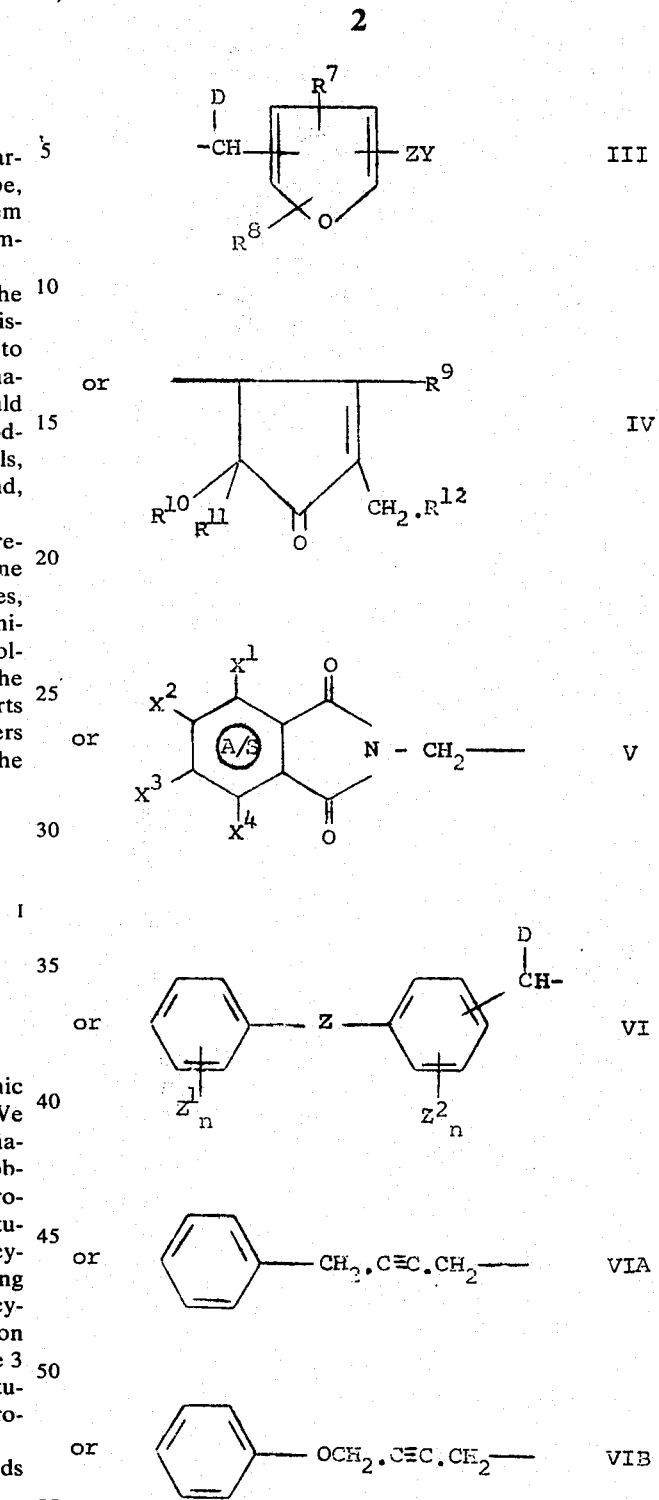

wherein
Y represents hydrogen or an alkyl, alkenyl or alkynyl group or an aryl or furyl group which is unsubstituted or substituted in the ring by one or more alkyl, alkenyl, alkoxy or halogeno groups, $R^7$ and $R^8$, which may be the same or different, each represent hydrogen or an alkyl or alkenyl group,
$R^9$ represents hydrogen or a methyl group,
$R^{10}$ and $R^{11}$, which may be the same or different, each represent hydrogen or an alkyl group, $R^{12}$ represents an organic radical having carbon-carbon unsaturation in a position $\alpha$ to the $CH_2$ group to which $R^{12}$ is attached, A/S indicates an aromatic ring or a dihydro or tetrahydro analogue thereof, $X^1$, $X^2$, $X^3$ and $X^4$, which may be the same or different, each represent hydrogen, chlorine or a methyl group, D represents H, -CN or -C ≡ CH, Z represents $—CH_2—$ or $—O—$, $—CO—$ or $—S—$, $Z^1$ and $Z^2$, which may be the same or different, each represent chlorine or a methyl group and $n = 0$, 1 or 2.

The esters of the present invention where R represents a group of formula III, IV, V, VI, VIA or VIB are insecticidal esters having a valuable combination of toxicity and knock down properties.

The esters of the present invention where R represents alkyl are not insecticidal but are useful intermediates in the production of the insecticidal esters some of which can be converted by acid catalysis, e.g. using toluene-4-sulphonic acid in benzene, to the corresponding free carboxylic acid.

As will be discussed in more detail below, the new alkyl esters of the present invention are prepared in that form by a condensation reaction and it is necessary to convert the alkyl ester into the free carboxylic acid in order to produce the insecticidal esters of the invention. This is best achieved selectively utilising a tert-butyl ester (R = tert-butyl). However, if desired, a tert-butyl or other alkyl ester can be converted into the free carboxylic acid, by partial saponification but it is difficult to prevent modification of the oxime group at the same time. The free acid, and its salts and the acid halides into which it can be converted for final conversion to insecticidal esters form further aspects of the invention.

The insecticidal esters of the present invention may be regarded structurally as esters of a 3-substituted-2,2-dimethylcyclopropane carboxylic acid and an alcohol e.g. a furylmethyl alcohol or a cyclopentenolone. While the esters may be conveniently described structurally in these terms, it will be appreciated and explained in more detail below, that the esters can be prepared by methods other than esterifying the acid with the alcohol and, in practice, normally are.

So far as the various values of $R^1$ are concerned, it is preferred that the alkyl or alkenyl residues contain up to 6 carbon atoms and methyl, ethyl, n-propyl, isopropyl, the various isomeric butyl groups and allyl groups are of particular interest.

When the esters of the present invention are alkyl esters, it is preferred that the alkyl group be one containing up to 6 carbon atoms and we have found that methyl, ethyl and tertiary butyl esters are amongst those which can be readily prepared by our synthetic methods.

When the ester is one formally derivable from a furylmethyl alcohol, it is preferred that the furylmethyl alcohol be a 3-furylmethyl alcohol as described and claimed in U.S. Pat. No. 3,466,304.

In the furylmethyl alcohols, and particularly in the 3-furylmethyl alcohols, it is preferred that $R^7$ and $R^8$ each represent hydrogen or groups containing up to 4 carbon atoms, particularly a methyl group and that Y represents a phenyl group which is unsubstituted or substituted in the ring by a group containing up to 4 carbon atoms, e.g. methyl or methoxy, or by chlorine and $Z = CH_2$ and D = H. Analogues of these compounds where $Z = O$, S or CO and D = CN or C ≡ CH are also of interest. Further compounds of interest are those where Y represents a hydrogen atom, an alkyl group containing up to 4 carbon atoms, an alkenyl group containing up to 4 carbon atoms, e.g. vinyl, an alkadienyl group containing up to 4 carbon atoms or an alkynyl group e.g. propargyl or a furyl group.

Specific alcohols of this category, from which the esters of the invention are formally derivable, include 5-benzyl-3-furylmethyl alcohol, 5-benzyl-2-methyl-3-furylmethyl alcohol, 5-benzylfurfuryl alcohol, 4-benzyl-5-methylfurfuryl alcohol, 5-p-xylyl-furfuryl alcohol, 2,4,5-trimethyl-3-furylmethyl alcohol and 4,5-dimethyl-furfuryl alcohol, 5-phenoxy and 5-benzoyl-3-furylmethyl alcohol and $\alpha$-cyano and $\alpha$-ethynyl substituted 5-benzyl-, 5-benzoyl or 5-phenoxy-3-furylmethyl alcohol.

The cyclopentenolones from which the esters of the invention are formally derivable are those unsubstituted in the 3-position or those substituted in the 3-position by a methyl group, ($R^9$ = H or $CH_3$).

The cyclopentenolones unsubstituted in the 3-position are described and claimed in U.S. Pat. No. 3,720,703.

Some of these alcohols are the 3-demethyl analogues of the alcohols from which the naturally occurring pyrethrins are derived. In the present invention, it is preferred that $R^{10}$ and $R^{11}$ each represent hydrogen, methyl or ethyl and $R^{12}$ represents an aryl group such as a phenyl group or a phenyl group substituted by a halogeno or alkyl or alkoxy substituent of 1 to 4 carbon atoms, for example tolyl, xylyl, p-chlorophenyl or p-methoxyphenyl. $R^{12}$ may also represent a 2- or 3- furyl group or an alkenyl group such as a vinyl, prop-1-enyl or buta-1,3-dienyl group.

When the esters of the invention are formally derivable from the cyclopentenolones which are substituted in the 3- position by the methyl group, ($R^9$ = methyl), the esters may be derived from allethrolone ($R^{10} = R^{11}$ = H, $R^{12}$ = vinyl), pyrethrolone ($R^{10} = R^{11}$= H, $R^{12}$ = buta-1,3-dienyl), cinerolone ($R^{10} = R^{11}$ = H, $R^{12}$ = prop-1-enyl), jasmolone ($R^{10} = R^{11}$ = H, $R^{12}$ = but-1-enyl) or furethrolone ($R^{10} = R^{11}$ = H, $R^{12}$ = 2-furyl).

When the esters of the invention are phthalimidomethyl esters where R is of formula V, they may be phthalimido; dihydrophthalimido or tetrahydrophthalimidomethyl esters where the phthalimido, dihydrophthalimido or tetrahydrophthalimido residue is one described in British Pat. Specifications Nos. 985,006, 1,052,119 or 1,058,309. 3,4,5,6-Tetrahydrophthalimidomethyl esters are of particular interest.

When the esters of the invention are those where R is of formula VI, it is preferred that they be 3-benzylbenzyl esters, 3-benzoylbenzyl esters or 3-phenoxybenzyl esters although each of the rings may be substituted by up to 3 chloro and/or methyl groups. Other esters of particular interest where R is of formula VI are those where Z represents O or $CH_2$ and D represents CN or C ≡ CH, e.g. esters of $\alpha$-cyano or $\alpha$-ethynyl substituted 3-phenoxy-, 3-benzyl or 3-benzoylbenzyl alcohol.

The compounds of the present invention exhibit geometrical and optical isomerism and consequently may be prepared in optically active forms which may subsequently be mixed together or as racemic mixtures which may subsequently be resolved into optically active forms. In addition, optically active forms of racemic mixtures can be separated into the individual geometrical isomers. The various optical and geometrical isomers of the esters of the invention usually have different insecticidal toxicities and knock down potency. In the α-cyano and α-ethynyl compounds (D = CN or C≡CH) there is a further possibility of optical isomerism and the compounds envisaged include the separate isomers and mixtures thereof resulting from asymmetry at the carbon atom bearing the D group.

Esters in which the two hydrogen atoms on the cyclopropane ring are in the absolute stereochemical relationship equivalent to that in (+)-trans-chrysanthemic acid, which we now refer to as [IR-trans] esters, tend to be amongst the most insecticidally active of the various isomers and are preferred for that reason, but the [IR-cis] are also very active and the (+)-trans, (+)-cis and (+)-cis-trans isomers are also of interest. We have previously used the nomenclature (+)-cis, (+)-trans, (+)-cis,trans etc. in relation to compounds where the stereochemistry about the cyclopropane ring is equivalent to (+)-cis, (+)-trans, (+)-cis,trans etc. chrysanthemic acid. For compounds of the invention which are substantially pure optical and geometrical isomers, we are proposing the nomenclature [IR, cis] and [IR, trans] as a convenient alternative to [IR,3S] and [IR,3R] when specified in accordance with the strict nomenclature based on the sequence rule (Cahn et al., Angew. Chem. Int. Ed. 5 385 (1966)).

The insecticidal esters of the present invention may be prepared by esterification involving the reaction of an alcohol or derivative thereof of formula R - Q e.g. of formula VII or VIII, and a cyclopropane carboxylic acid or derivative thereof of formula IX,

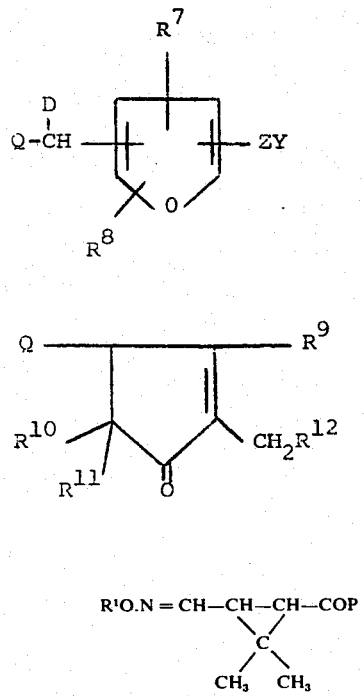

where Q and COP are functional groups or atoms which will react together to form an ester linkage and R, R$^1$, R$^7$, R$^8$, R$^9$, R$^{10}$, R$^{11}$, R$^{12}$, Z and Y are as defined above.

It is usually convenient in practice either to react the acid or acid halide with the alcohol (COP — COOH or CO— halide and Q = OH) or to react a halogeno compound (Q = halogen) with a salt of the carboxylic acid (COP = COO — M$^+$ where M is, for example, a silver or triethylammonium cation).

Transesterification is not always practical and, it is preferred to prepare the intermediate alkyl ester as a tert.butyl ester (R = tert.butyl) which can be selectively converted under acid conditions as mentioned earlier to give the free acid which can be esterified e.g. after conversion to the acid halide, to an insecticidal ester.

The alkyl esters of the present invention can be prepared by reacting an ester of caronaldehyde of formula XI

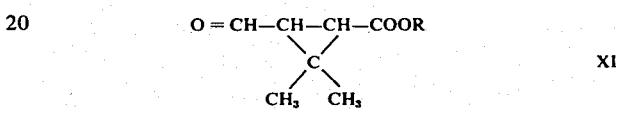

where R is an alkyl group, with hydroxylamine or an alkoxylamine of formula R$^1$ONH$_2$ where R$^1$ is as defined above, and, in the case where R$^1$ represents hydrogen, subsequently alkylating the resulting oxime, if desired, with an alkyl (or alkenyl) halide to give an alkoxime (or alkenyloxime). Oxime formation can take place by reacting substantially equimolar amounts of aldehyde and hydroxylamine or alkoxylamine in a polar solvent such as an alkanol, e.g. ethanol or dioxane. When the aldehyde is converted into the oxime by reaction with hydroxylamine and it is desired to convert the resulting oxime into an alkylated or alkenylated derivative, this reaction may be carried out by procedures customarily used for the alkylation of phenols. Thus, the oxime may be reacted in a polar solvent, such as ethanol, with an alkyl halide, typically the bromide, in the presence of a hydrogen halide acceptor and the mixture heated until reaction is complete.

Oxime formation is normally carried out using an acid addition salt of hydroxylamine or the alkoxylamine, e.g. the hydrochloride. In cases where it is desired to prepare a compound of formula II where R$^1$ represents methyl, the availability of methoxylamine hydrochloride makes it generally more convenient to carry out the reaction in one step using methoxylamine hydrochloride but when compounds are required where R$^1$ represents a larger alkyl group, it is usually more convenient to form the oxime first and subsequently to alkylate or alkenylate the oxime.

Alcohols and halides of formula VIII are described and claimed in U.S. Pat. No. 3,720,703.

Alcohols of formula R — Q where R is a group of formula VI may be prepared by reduction of the corresponding acids or esters or aldehyde e.g. with hydride, or by conversion of the corresponding halide to an ester e.g. by reaction with sodium acetate, followed by hydrolysis of the ester, or by reaction of formaldehyde with a Grignard reagent derived from the corresponding halide. The halides of formula RQ where R is a group of formula VI can be prepared by halomethylation of the compound:

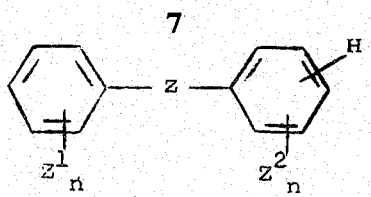

or side chain halogenation of:

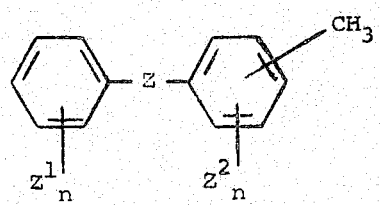

One or more of the insecticidal esters of the invention may be formulated with an inert carrier or diluent to give insecticidal compositions and these may be prepared, for example, in the form of dusts and granular solids, wettable powders, mosquito coils and other solid preparations or as emulsions, emulsifiable concentrates, sprays and aerosols and other liquid preparations after the addition of the appropriate solvents, diluents and surface active agents. Knock-down agents may also be added to these compositions as may pyrethrum synergists such as piperonyl butoxide.

The new esters of the invention or insecticidal compositions containing them may be used for killing insects or controlling the level of insects on a domestic or agricultural scale by teating the insects themselves or an environment susceptible to insect attack with the compounds or compositions.

The following Examples are given to illustrate the present invention (temperatures are in °C, refractive indices are measured at 20°C. Unless otherwise stated, the hydrogen atoms at $C_1$ and $C_3$ of the cyclopropane ring are in trans relationship to one another).

EXAMPLE 1

A mixture of hydroxylamine hydrochloride (2.51 g) in dioxane (30 ml) and water (5 ml) was added to t.-butyl trans caronaldehyde (obtained by ozonolysis of the t.-butyl ester of (+)-trans-chrysanthemic acid). Pyridine (5 ml) was added and the whole mixture thoroughly shaken and left for 3 hours with occasional shaking. The mixture was then evaporated and 20 ml water added and the solution extracted with diethyl ether. The ethereal solution was washed with saturated sodium chloride solution, dried over sodium sulphate and evaporated to give 2.93 g. t-butyl caronaldoxime, m.p. 62°–76°C. The structure of this compound was confirmed by NMR. This compound is designated compound P 23 A'.

EXAMPLE 2

A mixture containing 0.5 g t-butyl caronaldoxime prepared as described in Example 1, 0.4 g ethyl bromide and 0.5 g anhydrous potassium carbonate in 10 ml ethanol was refluxed for six hours. The mixture was then cooled, filtered and the filtrate evaporated. The residue was passed through a column of neutral alumina and eluted with benzene to give 0.31 g. t-butyl-2,2-dimethyl-3-formylcyclopropane carboxylate ethoxime, $n_D$ 1.4552. The structure of this ethoxime was confirmed by NMR. This compound was designated P 24 B'.

The procedure described above was repeated replacing the ethyl bromide by an equivalent amount of n-propyl iodide or allyl bromide to give the corresponding propoximes or allyl oximes of formula II where R = t-butyl and $R^1$ = n-propyl, $n_D$ 1.4534 and R = t-butyl and $R^1$ = allyl, $n_D{}^{20}$ 1.4603. These compounds are designated P 23 C' and P 23 D' respectively. The structure of these compounds was confirmed by NMR.

EXAMPLE 3

A mixture of 0.5 g methoxylamine hydrochloride dissolved in 6 ml dioxane and 1 ml water was treated first with 0.5 g t-butyl trans caronaldehyde (obtained by ozonolysis of t-butyl:(+)-trans chrysanthemate) and then with 0.5 ml pyridine. The solution was left for 0.5 hours and the solvent then removed. The residue was extracted with diethyl ether and the ethereal solution washed first with water and then with saturated sodium chloride solution and finally dried over sodium sulphate. Evaporation of the solvent left 0.56 g t-butyl-2,2-dimethyl-3-formylcyclopropane carboxylate methoxime as a residue $n_D$ 1.4542. The structure of this compound was confirmed by NMR. The compound was designated P 23 E'.

EXAMPLE 4

A mixture containing 302 mg of the t-butyl methoxime described in Example 3 and 42 mg toluene 4-sulphonic acid in 9 ml dry benzene was refluxed for 2 hours and cooled. The methoxime of 2,2-dimethyl-3-formylcyclopropane carboxylic acid in the solution was identified by NMR. Pyridine (120 mg, 127 micro-liters) and thionyl chloride (158 mg, 96 micro-liters), were added to the solution of the free carboxylic acid and the mixture left at room temperature for 3 hours after which time the free carboxylic acid had been converted into its acid chloride. The presence of the acid chloride was confirmed by NMR. A solution of 275 mg 5-benzyl-3-furylmethyl alcohol and 105 mg (107 micro-liters) pyridine in 5 ml benzene was added to the solution of the acid chloride and the mixture left to stand overnight. The supernatant liquid was then chromatographed on a neutral alumina column and eluted with benzene to give 195 mg of the 5-benzyl-3-furylmethyl ester of the [IR, trans]-methoxime of 2,2-dimethyl-3-formylcyclopropane carboxylic acid, $n_D$ 1.5332. This is a compound of formula II where R = 5-benzyl-3-furylmethyl and $R^1$ = methyl. This compound was designated P 23 E.

The procedure described above was repeated replacing the methoxime by the propoxime, ethoxime or allyloxime described above, compounds P 23 C', P 23 B' and P 23 D' respectively. The following products were obtained which are compounds of formula II where R = 5-benzyl-3-furylmethyl.

| Compound | $R^1$ | $n_D$ |
| --- | --- | --- |
| P 23 C | n-propyl | 1.5228 |
| P 23 B | ethyl | 1.5266 |
| P 23 D | allyl | 1.5326 |

EXAMPLE 5 t-Butyl-2,2-dimethyl-3-formyl cyclopropane carboxylate methoxime was prepared as described in Example 3. The methoxime (300 mg), toluene-4-sulphonic acid (40 mg) and benzene (8 ml) were refluxed for 2½ hours and cooled. Pyridine (126 µl) and thionyl chloride (112 µl) were added and the mixture left to stand at room temperature for 3 hours. A solution of pyridine (107 µl) and (±)-α-cyano-3-phenoxybenzyl alcohol (320 mg) in benzene (5 ml) was added to the acid chloride and left to stand over night. The reaction mixture was then chromatographed on neutral alumina which was eluted with benzene to give, on evaporation of the solvent, (±)-α-cyano-3-phenoxybenzyl [IR-trans]-2,2-dimethyl-3-formylcyclopropane carboxylate methoxime, $n_D^{20}$ 1.5425. (Compound P 23 F).

EXAMPLE 6

The procedure described in Example 5 was repeated but replacing the α-cyano-3-phenoxybenzyl alcohol by 3-phenoxybenzyl alcohol. The resulting 3-phenoxybenzyl [IR-trans]-2,2-dimethyl 3-formyl cyclopropane carboxylate methoxime had $n_D$ 1.5510. [Compound P 23 G].

The toxicity of the compounds of the invention towards houseflies and mustard beetles was assessed by conventional assay procedures and compared with the toxicity of 5-benzyl-3-furylmethyl (+)-trans-chrysanthemate which is arbitrarily given a relative toxicity of 1000. The following relative toxicities were calculated.

| Compound | Relative toxicity to | |
|---|---|---|
| | Houseflies | Mustard Beetles |
| P 23 E | 590 | 1700 |
| P 23 B | 620 | 890 |
| P 23 C | 260 | 850 |
| P 23 D | 300 | 570 |
| P 23 F | 130 | 180 |
| P 23 G | 390 | 470 |
| 5-Benzyl-3-furylmethyl-(+)-trans-chrysanthemate | 1000 | 1000 |

We claim:

1. A cyclopropane carboxylic acid or derivative thereof of the formula:

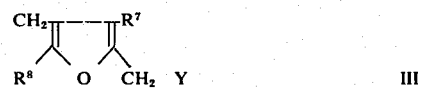

wherein $R^1$ represents hydrogen or an alkyl or alkenyl group containing up to 6 carbon atoms and $Z^1$ represents halogen or OR where R represents hydrogen, an alkali metal, silver or triethylammonium, or an alkyl group containing up to 6 carbon atoms or a group of the formula:

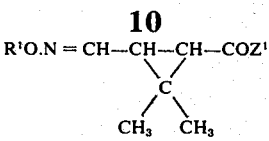

wherein Y represents hydrogen or lower alkyl, lower alkenyl or phenyl or phenyl substituted by lower alkyl, lower alkoxy or chlorine, and $R^7$ and $R^8$, which may be the same or different, each represent hydrogen or an alkyl or alkenyl group containing up to 4 carbon atoms.

2. An acid or derivative thereof according to claim 1, wherein $R^1$ represents hydrogen, methyl, ethyl, propyl or allyl.

3. An ester according to claim 1, wherein R represents a group of formula III.

4. An acid or derivative thereof according to claim 1, wherein Z represents $CH_2$, CO or O and Y represents phenyl.

5. An acid or derivative thereof according to claim 1, wherein the two hydrogen atoms on the cyclopropane ring are in the equivalent stereochemical relationship as in (+)-trans-chrysanthemic acid.

6. An ester according to claim 2, wherein R represents 5-benzyl-3-furylmethyl.

7. An ester according to claim 2, wherein R represents α-cyano-5-benzyl-3-furylmethyl.

8. An acid or derivative thereof according to claim 1, wherein R represents hydrogen (or an alkali metal salt or acid chloride of that acid) or wherein R represents tert.butyl.

9. The compound according to claim 1, wherein R represents 5-benzyl-3-furylmethyl and $R^1$ represents hydrogen, methyl, ethyl, n-propyl or allyl.

* * * * *